Patented Dec. 2, 1924.

1,517,543

UNITED STATES PATENT OFFICE.

FRANK M. DORSEY, OF CLEVELAND, OHIO, ASSIGNOR TO GENERAL ELECTRIC COMPANY, A CORPORATION OF NEW YORK.

METHOD OF ACTIVATING CARBON.

No Drawing. Application filed July 16, 1919. Serial No. 311,189.

*To all whom it may concern:*

Be it known that I, FRANK M. DORSEY, a citizen of the United States, residing at Cleveland, in the county of Cuyahoga, State of Ohio, have invented certain new and useful Improvements in Methods of Activating Carbon, of which the following is a specification.

My invention relates to an improved form of carbon and to a method of producing the same, such carbon being characterized by being essentially a pure form of amorphous carbon deposited at low temperatures and free from adsorbed stabilized hydrocarbons which are normally associated with it and which lessens its power of combining with other substances, as well as free from inactive carbon formed by gas treating, i. e. by the decomposition of hydrocarbons upon its surface at high temperatures. There is good authority for regarding such form of carbon as a true allotropic modification. In any event it is known to be rapidly attacked by oxidizing agents and has a capacity for adsorbing various substances and particularly volatile and gaseous substances to a remarkable degree. Such "activated carbon", or charcoal, has, particularly as a result of its use in gas masks during the great war, achieved the status of a distinctive product and is generally known both to scientists and in the trade under the name just given. Certain recognized tests of the so-called activity of this type of carbon will be hereinafter set forth and by means thereof it may be readily distinguished in a practical way from so-called "decolorizing carbons" as well as from ordinary wood charcoal and animal charcoal or boneblack, all of which have been used in a limited way for many years past to clarify liquids, such as sugar solutions, and in a limited and experimental fashion as adsorption agents.

In the distillation of carbonaceous materials such as woods and coals, varying amounts of volatile matter go off depending upon the temperature and pressure used in the retort and the time of distillation. In the ordinary practice of distilling vegetable material for the production of acetic acid, alcohol and acetone, the material is placed on cars in iron retorts which are set in a furnace housing and kept at an average temperature of from 400 to 600 degrees centigrade for about 10 hours. During the process of distillation, the water which is contained in the wood is driven off and goes out through the vent pipes and the cellulose and resinous or ligneous material start to decompose thereby producing gases, vapors and viscous substances in addition to the charcoal residue. All products which exist in vapor form at the temperature and pressure used in the retort escape through the vents, the heavy viscous materials escaping through the outlet vent in the bottom of the retort which conducts it to a tar tank leaving a solid residue in the retort commonly known as charcoal. Such charcoal is inactive from the standpoint of absorbing or adsorbing gases, does not possess any catalytic properties and is generally used for its fuel value. The charcoal thus produced is inactive probably because the pores are clogged with a residue of heavy hydrocarbon which, at ordinary temperature, is a solid just as is coal tar pitch and petroleum pitch.

In order to activate carbon, it seems to be necessary that the last traces of hydrocarbons be removed before exposing the carbon to the compounds which it is intended to adsorb. In the course of my work I have learned that the sources of the hydrocarbons which must be removed are organic compounds which exist in the carbonaceous material before distillation or are produced during distillation and that, by the removal of these compounds during distillation, I produce directly an activated carbon which does not require a subsequent activating process. My process of activating consists in the substantially complete removal of the hydrocarbons from the carbon structure. More specifically my process consisting in distilling the carbonaceous material in refractory retorts where the temperature is raised to preferably between 700 and 1000 degrees centigrade and then admitting steam preferably during the distillation period although good results may be obtained even though the distillation is practically completed. However, the first method amounts to activating the carbon during the process of distillation and thus saves time and fuel as well as equipment. The steam serves to oxidize selectively the hydrocarbons and thus free the pores of the carbon from substantially all traces of hydrocarbons as well as to carry the gases and vapors away from the carbon and so to prevent them from cracking and leaving a deposit of inactive carbon or hydrocarbons in the pores or on the surface of the carbon structure.

According to the preferred form of my invention, I distill, for example, broken cocoanut shells for about 8 hours at a temperature of approximately 950 degrees centigrade and continuously admit steam preferably after the fourth hour at the rate of 200 pounds per hour with occasional agitation of the heated material. For every 2000 pounds of cocoanut shells, I secure about 300 pounds of activated carbon which, when ground and screened, leaves approximately 225 pounds. The activity of the carbon at this point is between 200 and 750. The unit of activity is explained hereinafter. The temperature may be made as low as 700 degrees centigrade and still produce activated carbon. It is probable that the practical upper temperature limit should not be above 1500° but higher temperatures may be utilized with somewhat less advantageous results. Care should be taken not to raise the temperature so high that the activating atmosphere will attack the carbon and so reduce the quality and quantity of the yield. Steam may be admitted from the beginning of the distillation process but, for economic reasons, it is better to wait until distillation is well under way because it is then that the steam does its effective work. The period of distillation varies with the temperature and may readily be determined for different temperatures.

For the carbonaceous material, I may use wood fiber, cocoanut shells, fruit pits, coals, or other carbonaceous substances but I find that the best activated carbon is produced from those materials such, for instance, as cocoanut shells and peach stones, which have a high apparent density and a stone cell structure.

I have expressed activity as the number of minutes a standard tube would absorb chloropicrin from air without letting any gas leak through the tube but another method of determining activity is to determine the amount of water absorbed from moist air at a given temperature. Thus, activated carbon which will take up 10 to 30 per cent by weight of water from air of approximately 60 per cent saturation at 15 degrees centigrade has an activity of 200 to 750 respectively as determined by the chloropicrin method. According to the chloropicrin method, which is standard, the charcoal to be tested is dropped into a tube of 1.4 cm. inside diameter so that it forms a column 10 cm. in length. The air gas mixture is passed through it at the rate of 1000 cc. per minute per sq. cm. cross section, or 1570 cc. per minute. The concentration of chloropicrin is 7.5 parts per thousand by volume, which is attained by passing dry air through chloropicrin at 0oC. The first slight amount of chloropicrin which "breaks" through is detected by a green color imparted to a gas flame when the effluent air from the charcoal is fed into it thru a red-hot copper wire coil placed within the flame.

The time in minutes that it takes for any trace of chloropicrin to pass through is multiplied by a factor, 15, which gives us the time it would take for a detectable amount of chloropicrin to pass through a 5 cm. column of charcoal if the concentration of the air-gas mixture were one part per thousand of chloropicrin by column, and if the rate of flow were 500 cc. per minute per sq. cm. cross-section of the charcoal column.

There are many uses for the activated carbon produced by the above described process and by other processes and the application of activated carbon in general to certain of these uses as hereinafter set forth is a part of my invention. It may be used to assist in the production of high vacuum and for cleaning up residual gases in connection with the exhausting operation in the manufacture of incandescent lamps and similar articles. It makes a suitable catalytic agent for the production of various chemical compounds.

It may be used to remove arsine from hydrogen gas and hydrocarbon vapors from air, natural and artificial gas and other gases. It may also be used for clarifying liquids especially from the standpoint of removing finely suspended particles and discoloring elements. The recovery of halogen compounds from solutions or gases may also be accomplished through it. In purifying water, activated carbon will absorb mineral and organic compounds.

Activated carbon may be used in gas masks for the removal of poisonous gases and vapors from the inhaled air. Its compact form, high adsorptive powers and reliability particularly adapt it for such use. Another analogous use is in the administration of anesthetics wherein activated carbon may be utilized to contain the anesthetic.

The use of my activated carbon for solvent recovery is important. In various industries, thousands of gallons of gasoline per day are used to dissolve substances such as rubber, etc., and are evaporated out during the refining process. This gasoline is often lost, although it has been attempted to recover it. The gasoline vapor and air may be drawn by pumps through a conduit containing activated carbon wherein it is absorbed and the air allowed to escape through a suitable outlet. The gasoline may be readily recovered from the carbon. The activated carbon may be used repeatedly as it does not appreciably deteriorate.

Similarly gasoline may be removed from natural gas. The gas may be passed through a tube containing activated carbon, the gasoline absorbed and the gas passed to the gas mains.

What I claim as new and desire to secure by Letters Patent of the United States is:—

1. In a method of making activated carbon of the character described, the steps which consists in first subjecting carbonaceous material to a distillation process at a temperature above 700 degrees centigrade; and then after such distillation process has progressed at least two hours but before its completion subjecting such material to the action of a gas capable of preferentially oxidizing the residual hydrocarbons in such material.

2. In a method of making activated carbon of the character described, the steps which consist in first subjecting carbonaceous material to a distillation process at a temperature above 700 degrees centigrade; and then after such distillation process has progressed at least two hours but before its completion subjecting such material to the action of an oxidizing gas, the conditions of heating during such last mentioned step being such as not to cause substantial combustion of the carbon.

3. In a method of making activated carbon of the character described, the steps which consist in first subjecting carbonaceous material to a distillation process at a temperature above 700 degrees centigrade; and then after such distillation process has progressed at least two hours but before its completion subjecting such material to the action of steam.

4. In a method of making activated carbon of the character described, the steps which consist in first subjecting carbonaceous material to a distillation process at a temperature above 700 degrees centigrade; and then after such distillaton process has progressed at least two hours but before its completion subjecting such material to the action of steam, the conditions of heating during such last mentioned step being such as not to cause substantial combustion of the carbon.

In witness whereof, I have hereunto set my hand this 11th day of July, 1919.

FRANK M. DORSEY.